United States
Olson

[11] 3,864,024
[5] Feb. 4, 1975

[54] OPTICAL DISPLAY DEVICE
[76] Inventor: Gust A. Olson, 2030 Manning Ave., Los Angeles, Calif. 90025
[22] Filed: Mar. 26, 1973
[21] Appl. No.: 345,170

[52] U.S. Cl................ 350/161, 40/52 R, 250/567, 350/267, 350/269
[51] Int. Cl. ............................................ G02f 1/36
[58] Field of Search .......... 350/161, 160, 267, 269; 356/71; 40/52 R, 106.21

[56] References Cited
UNITED STATES PATENTS
1,782,328  11/1930  Wearham............................ 350/267
3,407,401  10/1968  Frohbech et al.................... 350/269
3,627,991  12/1971  Beall et al........................... 350/161
3,756,693   9/1973  Ota ................................... 350/160 R Primary Examiner—Vincent P. McGraw
Attorney, Agent, or Firm—Harry R. Lubcke

[57] ABSTRACT

A selectively changeable composite optical display having a transparent solid layer, a flexible layer spaced therefrom having a given color or white or black, and an opaque quasi-liquid layer interposed and contained between the layers. The opaque layer has a contrasting color to that of the flexible layer or black or white. At least one rigid element having the shape of a desired alpha-numeric or other representation is impressed upon the flexible layer until that layer contacts the solid transparent layer according to the desired representation. This forces away the opaque quasi-liquid in the impressed areas and exhibits the representation for viewing through the transparent solid layer. In the un-actuated state the opaque quasi-liquid is a continuous volume that blocks the elastic layer from view.

13 Claims, 6 Drawing Figures

PATENTED FEB 4 1975  3,864,024

OPTICAL DISPLAY DEVICE

BACKGROUND OF THE INVENTION

This invention pertains to optics, and to the principle of selectively differentially displacing portions of a structure to present a desired display.

The prior art has employed a number of structures operating on various principles to present a display, including gaseous glow lamps, plasma, liquid crystals, and others having selectively excitable electrodes for displaying an image.

Other prior art has employed total internal reflection of transparent bodies along with control devices to modulate such internal reflection. Still other art has employed total internal reflection along with means to frustrate such reflection. These devices require high optical precision because control of the light intensity is accomplished with mechanical movements of the order of a wavelength of light.

Certain other devices, typically of elemental size in a display matrix, have also employed the phenomenon of total reflection. Mechanical or magnetostriction manipulation of a liquid, a membrane, or a solid with respect to a prism of elemental size accomplishes absorbtive transmission, or dark, when the liquid is absent and is replaced by air.

The same effect has been obtained by diverting a liquid stream in or out of contact with an optical element.

Selectively orienting optically significant magnetic particles in a liquid vehicle by impressing suitable magnetic field configurations has also been employed.

Forming or removing metallic mercury between transparent layers to produce or destroy a mirror has also been employed.

BRIEF SUMMARY OF THE INVENTION

The essential functioning according to this invention has to do with displacing an opaque liquid or quasi-liquid from in front of a light-contrasting rear surface so that selected portions of the same can be viewed through a transparent front surface. The rear surface is made flexible, and means are provided for depressing the rear surface into contact with the rigid front surface. This necessarily removes the liquid and so the rear surface is displayed. The rear surface takes on the shape of the depressing means. Thus, by suitably shaping such means, and by providing more than one such means, almost any kind of display can be attained.

The liquid may be white and the rear surface black, or the two may have any contrasing colors, as has been set forth.

The means to depress include a linear bar, or any other shape, to mechanically contact the flexible layer, along with means to drive the bar or shape, such as a solenoid or spring.

Alternately, the layered composite structure may be depressed, in which case the bar(s) or shape remains stationary.

In an alternate embodiment for displaying embossed characters, such as to be found on thin plastic sheet stock as credit cards, the composite structure is formed into a cylinder. The embossed sheet stock is impressed upon the flexible surface of the composite structure, as by passing between it and a tangent additional cylinder, which may be fixed or compliantly supported. Both are supported to allow rotation.

In a still further alternate the photo-sensing means, typically used with the cylindrical embodiment, is traversed over a stationary composite structure.

DESCRIPTION OF THE PREFERRED EMBODIMENTS

Figure 1:
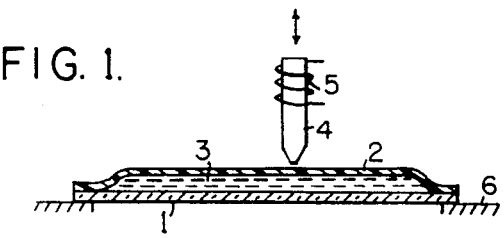
FIG. 1 is a sectional elevation view of the essential device in the non-display condition.

In FIG. 1 numeral 1 indicates a transparent solid layer. This may be glass, or preferably a glass-like plastic, such as methyl methacrylate (acrylic), or polystyrene.

A flexible layer 2 surmounts layer 1 and is peripherally attached to it. This may be a relatively thin elastomeric film, typically having a thickness of the order of ten thousandths of an inch, for reading embossed credit cards and the like. The material may be polyurethane, neoprene, or polyvinyl chloride.

Figure 6:
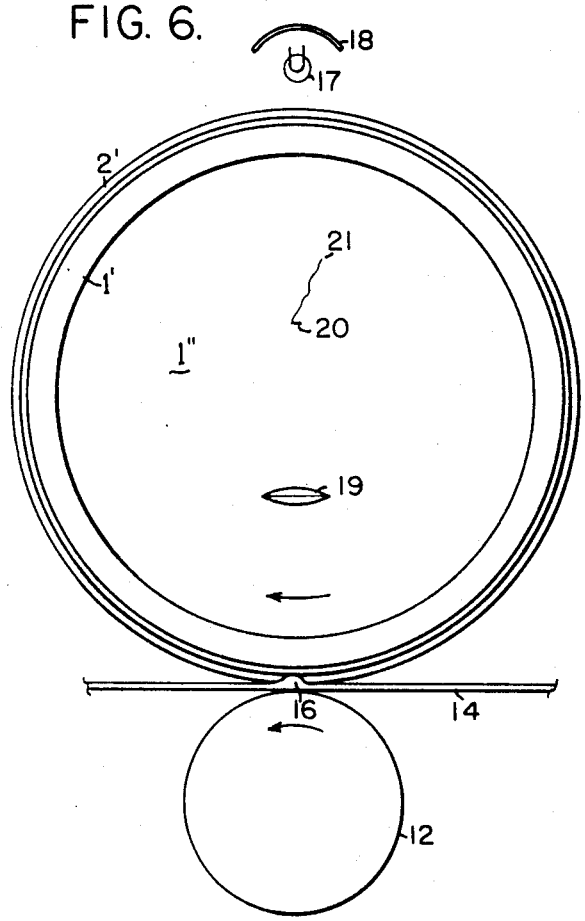
FIG. 6 is a side elevation of the cylindrical device of FIG. 5.

Opaque liquid or quasi-liquid 3 is interposed between layers 1 and 2. This raises flexible layer 2 and substantially fills the volume thus created. Layers 1 and 2 are sealed liquid-tight by a process appropriate to the materials employed, as by heat sealing, welding and ultrasonic welding for examples. The seal is formed completely around the periphery of the layers, which may have any shape, such as rectangular, square, round, etc. A strip may be formed into a cylinder, as shown in FIG. 6, in which case each of the sides of the strip are sealed but the circular circumference is individually sealed in butt joints so that the liquid layer is continuous.

In operation of the device, layer 2 is sufficiently flexible so that the liquid displaced by impressing a particular display is properly contained by a slight distension of layer 2 at other areas over the device.

The quasi-liquid 3 may be a silicone fluid, such as the Dow-Corning No. FS1265. A pigment, such as zinc oxide, is employed to give opacity.

Figure 2:
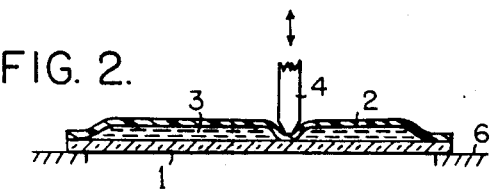
FIG. 2 is the same but with means depressing the flexible layer to form a display.
Figure 3:
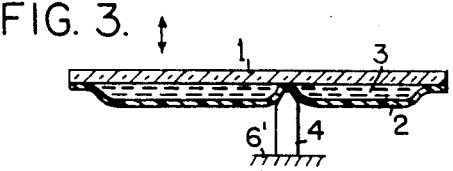
FIG. 3 is the same as FIG. 2, but with the composite layered structure being the movable element and the object being displayed as stationary.

As shown in FIGS. 1 through 3, bearing means 4 are provided. When these are depressed into flexible layer 2 by relative movement of these two elements until the layer is in contact with solid layer 1 the display is formed, for viewing through the transparent solid layer. When means 4 has the shape of a bar extending into and out of the paper of the drawings, the display will have the form of the numeral one, or the lower case letter "*l*" (ell).

Various other shapes for means 4 may be arranged, or, preferably, various other segments of numerals and/or letters may be independently provided. Suitable selective actuation of these means displays desired characters. Electronic logic is known that accepts an electrical signal, as the output from a computer, and suitably selectively energizes means 4 to form the signal-initiated alpha-numeric display.

Figure 5:
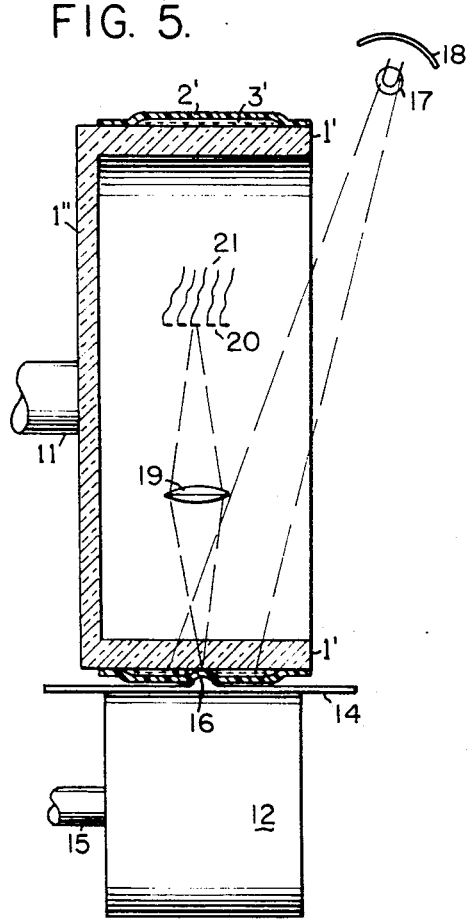
FIG. 5 is an end sectional elevation of the device formed in a cylindrical shape.

Conversely, as in FIG. 5, photosensitive elements 21, when exposed to a visible dispaly, may function to convert the display into machinereadable information.

Returning to FIG. 1, a solenoid is represented by coil 5 in combination with the upper portion, at least, of means 4 being of ferromagnetic material. Typically, the spacial and magnetic relation between elements 4 and 5 are such that passing current through coil 5 impresses means 4 into layer 2. The latter is returned to the non-display position shown in FIG. 1 by the inherent elasticity of flexible layer 2, or by a spring exerting a return force. The spring is not shown, but may be either tensional or compressional, as will be understood.

In alternate embodiments of the display device, layer 3 may be made thin, as one-thousandth of an inch, and etchings and other similar material having topographic characteristics may be exhibited. This also includes finger prints, the texture of embossed wood, and similar subject matter.

In FIGS. 1 and 2 solid layer 1 is represented as stationary, resting upon or attached to immovable "ground" 6, peripherally, for support, while still allowing viewing of the display through layer 1.

In FIG. 3 the motional arrangement is reversed. Bearing means 4 is stationary, upon ground 6', while any of the motion-producing means previously described in connection with means 4 are now connected to layer 1, for moving the whole layered composite structure to produce a display. This is then viewed from above.

Figure 4:
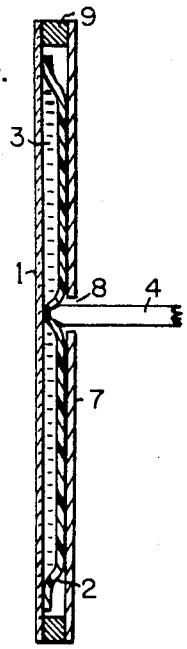
FIG. 4 is a sectional elevation of a vertical embodiment of the essential device.

In FIG. 4, the display structure is shown vertically oriented, which orientation may be taken as the limit of inclined embodiments, if these are desired in any practical application of the display device. In these instances it is required that flexible layer 2 be sufficiently stiff to retain substantially the uniformly spaced configuration shown in FIGS. 1 through 3. That is, to an extent that prevents malfunctioning; the absence of liquid layer 3 producing a spurious display, as at the top of the assembly.

Alternately, the additional structure shwon in FIG. 4 may be employed, particularly for comparatively large displays.

Solid transparent layer 1 remains the same, as largely do flexible layer 2 and quasi-liquid layer 3.

A new backing element 7 is introduced behind flexible layer 2. This backing is essentially rigid, and may be formed of any one of a variety of materials, including various types of plastics or metals. The essential function that element 7 performs is mechanical back-up, to prevent distension of the lower area of flexible layer 2 despite hydrostatic pressure due to gravity on quasi-liquid 3.

An aperture 8, only slightly larger than the bearing means 4, is formed in the appropriate position in backing element 7. The aperture has the configuration of means 4. When the latter is segmented, as for producing alpha-numeric characters, several apertures 8 are arranged as required. These are spaced one from the other sufficiently so that the backing function is not negated. A suitable rigid peripheral spacer 9 is employed to space element 7 from solid layer 1.

The display device may be embodied in various ways to present correspondingly different operating characteristics. A relatively thick flexible layer 2 may be used for bold displays, such as single large numerals or letters, while a relatively thin layer 2 is required to accomplish fine rendition, such as for finger prints. The display device may be formed as a relatively long strip, or as a rectangle, in order to impress a relatively large number of characters thereon.

In the alternate embodiment of FIG. 5, the transparent solid layer is formed into a hollow cylindrical shape 1'. Flexible layer 2' surrounds the solid layer. Liquid layer 3' is interposed between the other two, as before. Preferably integral with cylindrical solid layer is a circular disk 1'', which fastens the outer periphery to a shaft 11. The shaft is provided with suitable bearings and means to rotate it, say clockwise. These known elements have not been shown.

Auxiliary cylinder 12 is disposed radially beyond the periphery of cylindrical solid layer 1'. It is spaced sufficiently to accommodate additional layers 2' and 3' and also workpiece 14. The latter may be any kind of essentially rigid material having topographically impressed material carrying the information involved. One example is the widely used plastic credit card. This has bold alpha-numeric information embossed upon it, but there is no change of color between the information and the rest of the card, making it somewhat difficult to visually read the information.

Auxiliary cylinder 12 is similarly provided with a shaft 15 and suitable bearings and means to rotate it. Such means may operate synchronously with the means to rotate shaft 11, or either shaft may provide the motive power with the other shaft running free, depending upon the nature of the workpiece.

In FIGS. 5 and 6 a single embossed bump 16 is shown on workpiece 14 as a simplified example of topographic information. As shown particularly in FIG. 5, this raises flexible layer 2' into contact with solid layer 1', displacing liquid layer 3', and so exhibiting the embossing in the high contrast display of this invention.

The display may be visually examined by an operator looking into the cylindrical solid layer 1' from the open end. Alternately, the information can be taken off electronically as set forth below.

A light source 17, having reflector 18 or equivalent means to concentrate the light over the area at the bottom of cylindrical layer 1' is positioned generally as shown near the top of layer 1'. This illuminates the impressions of the workpiece into flexible layer 2', as required, and also avoids other elements of the optical system that are disposed within the cylinder.

Light-converging lens 19 is located within the cylinder and is spaced suitably away from the inner periphery thereof to form an image of the illuminated embossed information. At the plane of this image a series of photo-sensitive elements 20 are positioned, being held in place by means not shown.

The number and nature of photo-sensors 20 are chosen to properly handle the nature of the embossed characters on the workpiece. The five photo-sensitive elements shown in FIG. 5 are sufficient to read the somewhat stylized numeric characters employed on credit cards and similar documents. Suitable sensors are known semiconductor photo-diodes, miniature-sized photo-electric cells, or photo-conductive cells. For 16 elements a unitary array of photo-diode is commercially available from the RETICON Corporation of Mountain View, Calif.; type RL-16.

The electrical response of photo-sensors 20 to the moving embossed information at 16 may be processed by known logic circuitry to give electrical recognition of the alpha-numeric characters. Known electrical connections between the sensors and the circuitry are generally indicated at 21.

I claim:

1. A selectively changeable optical display, comprising;
   a. a transparent solid layer (1),
   b. a coextensive flexible layer (2) spaced from said solid layer, said flexible layer having a given reflectance property,
   c. an opaque quasi-liquid layer (3) interposed exclusively between said solid layer and said flexible layer, said opaque layer having a reflectance property optically contrasting to said given reflectance property, and
   d. selectable external means to bear (4) upon selected portions of said flexible layer to correspondingly displace said opaque layer, whereby the contrasting reflectance property of said flexible layer is selectively displayed for viewing through said solid layer.

2. The display of claim 1 in which;
   a. said given reflectance property is white, and
   b. said contrasting reflectance property is black.

3. The display of claim 1 in which;
   a. said given reflectance property is black, and
   b. said contrasting reflectance property is white.

4. The display of claim 1 in which;
   a. said given reflectance property is a color, and
   b. said contrasting reflectance property is substantially a complementary color to said color.

5. The display of claim 1 in which;
   a. said flexible layer is peripherally sealed to said solid layer to contain said opaque layer.

6. The display of claim 1 which additionally includes;
   a. electrical means (5) to actuate said means to selectively bear (4) upon said flexible layer.

7. The display of claim 1 in which said means to selectively bear (4) is comprised of;
   a. a rigid member having appreciable length parallel to said flexible layer, and
   b. electromagnet drive means attached to said rigid member on the side thereof away from said flexible layer to invariably move said rigid member toward said flexible layer.

8. The display of claim 1 in which;
   a. said means to selectively bear (4) is stationary, and
   b. the layered structure (1,2,3) is movable.

9. The display of claim 1 in which;
   a. said flexible layer is an elastomer of the group consisting of neoprene, polyurethane and silicon rubber.

10. The display of claim 1 in which;
    a. said transparent solid layer (1) is a glass-like plastic in the group consisting of methyl methacrylate and polystyrene.

11. The display of claim 1 in which;
    a. the opaque layer (3) is formed of a silicone fluid, and
    b. a pigment having the characteristics of zinc oxide.

12. The display of claim 1 which additionally includes;
    a. a rigid backing plate (7) disposed adjacent to said flexible layer (2) on the side away from said quasi-liquid layer (3)
    to generally support said flexible layer (2).

13. The display of claim 1 in which;
    a. the transparent solid layer (1') has a cylindrical shape, and
    b. said flexible layer (2') surrounds said solid layer, over said quasi-liquid layer.

* * * * *